US012750361B2

(12) United States Patent
Sharma et al.

(10) Patent No.: US 12,750,361 B2
(45) Date of Patent: Sep. 29, 2026

(54) AUTHENTICATING USER REQUESTS VIA INTERACTIONLESS AUTHENTICATION

(71) Applicant: Capital One Services, LLC, McLean, VA (US)

(72) Inventors: Meghnath Sharma, Chantilly, VA (US); Amanpreet Kaur Dhindsa, Aldie, VA (US); Jit Sen, Frisco, TX (US); Jason Pribble, McLean, VA (US); Daniel Brajkovic, Northbrook, IL (US)

(73) Assignee: Capital One Services, LLC, McLean, VA (US)

( * ) Notice: Subject to any disclaimer, the term of this patent is extended or adjusted under 35 U.S.C. 154(b) by 31 days.

(21) Appl. No.: 19/052,263

(22) Filed: Feb. 12, 2025

(65) Prior Publication Data

US 2026/0238639 A1 Aug. 13, 2026

(51) Int. Cl.
*H04L 29/06* (2006.01)
*H04L 9/40* (2022.01)

(52) U.S. Cl.
CPC ........ *H04L 63/0846* (2013.01); *H04L 63/108* (2013.01); *H04L 63/0876* (2013.01)

(58) Field of Classification Search
CPC ............... H04L 63/0846; H04L 63/108; H04L 63/0876; H04L 63/0884; H04L 63/083; G06Q 20/385
See application file for complete search history.

(56) References Cited

U.S. PATENT DOCUMENTS

| | | | | |
|---|---|---|---|---|
| 12,327,238 B2* | 6/2025 | Pearce | ................ | H04L 63/0815 |
| 2015/0310438 A1* | 10/2015 | Kassemi | .............. | G06Q 20/386 705/44 |
| 2016/0036790 A1* | 2/2016 | Shastry | .................. | G06Q 20/32 713/168 |
| 2016/0308862 A1* | 10/2016 | Rolfe | .................... | H04L 9/3231 |
| 2017/0026369 A1* | 1/2017 | Hao | ..................... | H04L 63/0876 |
| 2025/0150453 A1* | 5/2025 | Tilmon | ............... | H04L 63/1425 |

* cited by examiner

*Primary Examiner* — Harunur Rashid
(74) *Attorney, Agent, or Firm* — Foley & Lardner LLP

(57) ABSTRACT

Methods and systems for reducing network traffic associated with authenticating user requests via interactionless authentication are disclosed. For example, in connection with a user device transmitting a user request to access a resource, the system determines a first address associated with the user device. The system then transmits the first address to a third-party authentication platform that determines a Uniform Resource Locator (URL) that is specific to a mobile carrier. The system then transmits a verification token request associated with the mobile carrier. The system receives a verification token from the URL, and transmits an authentication request to the third-party authentication platform comprising the verification token. The system then receives, from the third-party authentication platform, an authentication response comprising a user device identifier. In response to receiving the authentication response, the system performs an authentication action associated with the user request.

20 Claims, 7 Drawing Sheets

300

AUTHENTICATING USER REQUESTS VIA INTERACTIONLESS AUTHENTICATION

BACKGROUND

In recent years, users have been able to interact with secured content from a variety of devices, including mobile devices. However, there is a need to ensure that only authorized users are able to access secured content. Existing authentication systems may limit access to such content to authorized users by using one or more software applications to accept user-provided passwords, access One Time Passwords (OTP), access Two Factor Authentication applications, provide answers to security questions, or provide biometric data prior to accessing the desired, protected content. While such authentication systems may provide a level of security to permit access to secured content, they require the user to physically interact with each application prior to accessing the secured content, which causes a poor user experience.

SUMMARY

Methods and systems are described herein for novel uses and/or improvements to authenticate users. In particular, the methods and systems are described herein to reduce network traffic associated with authenticating user requests via interactionless authentication.

For example, existing systems may prompt the user for information (e.g., passwords, pin codes, biometric data, OTPs, dynamic codes, etc.) when a user attempts to access secured content. To do so, the system may prompt the user to provide authentication information by transmitting notifications to a user device of the user asking the user. Such notifications may be a request for information that may authenticate the user when accessing the secured content that they desire and then transferring the responses to those requests over a computer network. For example, methods such as password-based authentication or security questions require the user to input information to authenticate their request. Other examples, such as OTP's, require the computer network to perform the additional steps of generating a temporary code and sending it to the user. Such authentication methods, however, use valuable computing network bandwidth and increase network traffic. In particular, where the user inadvertently inputs an incorrect password, code, or other information, computing network resources are susceptible to being wasted, as such systems must re-prompt the user for new authentication information and receive the new authentication information over the computing network. This may directly cause an increase in authentication latency as authentication systems handle a variety of authentication requests from hundreds if not thousands of users at a time. Hence, as these existing systems rely on error-prone manual inputting of authentication information, network traffic may be increased, thereby causing authentication delays that result in a poor user experience. While automatic inputting of passwords, pin codes, or other dynamically generated codes may aid in resolving such problems, these methods still rely on the request-response pattern (e.g., causing an increase in network traffic) and still require the user to physically interact with the authentication system.

The methods and systems overcome these technical problems by performing interactionless authentication of user requests. For example, the system reduces the amount of network traffic experienced by computing networks by (i) leveraging known information of a user device and (ii) performing such verification without requiring the user to enter data for an authentication request. For instance, as opposed to relying on the error-prone, user-provided authentication information, the system may perform authentication based on user-device information, thereby preventing unnecessary authentication requests from traversing computing networks.

For example, in connection with a user device transmitting a user request to access a resource, the system may determine a first address associated with the user device. For example, the first address may uniquely identify the user device, such as being an IP address of the user device. The system may then transmit the IP address to a third-party authentication platform to determine a carrier-specific Uniform Resource Locator (URL). The third-party authentication platform may include information that maps IP addresses of devices to mobile-device carrier information of the user device. For instance, because the user request may be to access content and the system may determine a unique identifier (e.g., IP address) of the user device, the system need not prompt the user for additional security information to authenticate the user. Rather, the system may leverage such known information to receive a URL (e.g., from the third-party authentication platform) associated with a carrier of the user device (e.g., cellular device) to further authenticate the user. The system may then use the URL and transmit a verification token request to the URL to obtain a verification token from the carrier. For example, the verification token may be a time-sensitive token that indicates that the user device of the user is (i) associated with the user and (ii) indicates that the user device is part of the mobile carrier's network. By doing so, the system may verify the identity of the user device.

However, while verifying the identity of the user device based on an IP address may improve secure access to content desired via the user request (e.g., the resource), such verification alone may be inadequate. For example, in the context of IP address masking or spoofing, unauthorized users may attempt to leverage such a method to gain access to the secured content or resources. As such, the system may verify whether another unique identifier associated with the user device is associated with another known unique identifier associated with the user device. For example, the user's device can then transmit an authentication request that includes the verification token to the third-party authentication platform. The third-party authentication platform may transmit an authentication response based on receiving the verification token that includes an additional user device identifier that is associated with the user device. For example, the additional user device identifier may be a phone number (or other identifier, such as a serial number) that is associated with the user device of the user. The system may then compare the additional user device identifier (e.g., the phone number, etc.) to known user device identifiers (e.g., phone numbers) that are associated with the user/user device to further authenticate the user device and/or user request. By doing so, the system may improve authentication security by not only relying on a third-party authentication platform but also leveraging pre-stored, known information that is associated with the user.

As such, the methods and systems reduce network traffic by authenticating the user through back-end interactions with a third-party. Such process eliminates user-initiated interactions associated with authenticating the user, such as requesting error-prone authentication information from a user and transmitting the error-prone authentication information over computing networks, and rather leverages nonsensitive information of the user. By doing so, the system may provide interactionless, secure authentication of users or user requests while reducing network traffic as compared to existing systems.

In some aspects, methods and systems for reducing network associated with authenticating user requests via interactionless authentication are disclosed. For example, in connection with a user device transmitting a user request to access a resource, the system may determine a first address associated with the user device, wherein the first address uniquely identifies the user device. The system may then transmit the first address to a third-party authentication platform that determines a Uniform Resource Locator (URL) that is specific to a mobile carrier of the mobile device of the user. In response to receiving a response indicating the URL, the system may transmit a verification token request to an interface associated with the mobile carrier based on the URL. The system may then receive a verification token from the interface, where the verification token verifies that the user device is associated with the mobile carrier. The system may then transmit an authentication request to the third-party authentication platform, the authentication request comprising the received verification token. The system may then receive, from the third-party authentication platform, an authentication response comprising a user device identifier associated with the user device of the user. In response to receiving the authentication response, the system performs an authentication action associated with the user request.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of “a,” “an,” and “the” include plural referents unless the context clearly dictates otherwise. In addition, as used in the specification and the claims, the term “or” means “and/or” unless the context clearly dictates otherwise. Additionally, as used in the specification, “a portion” refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
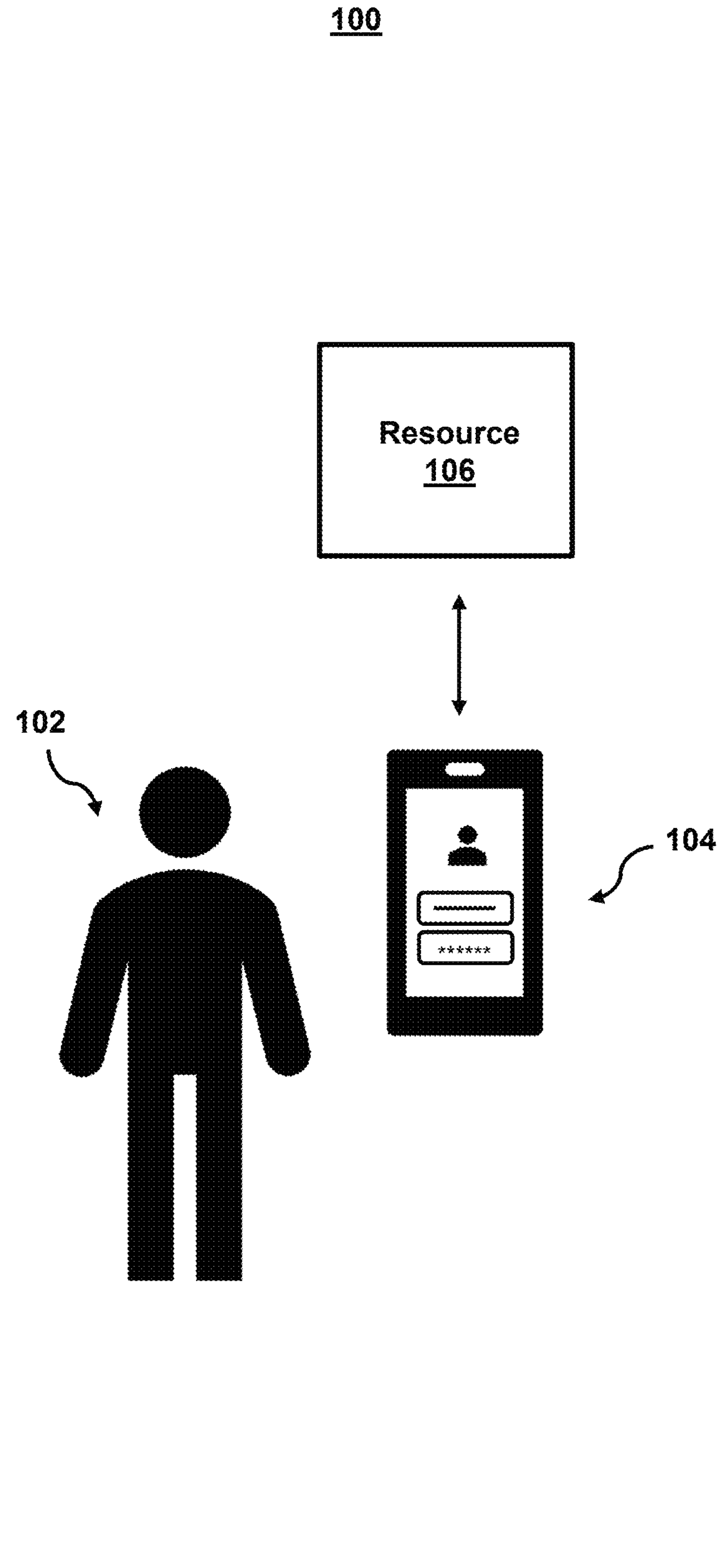
FIG. 1 shows an illustrative diagram for a user requesting to access a resource, in accordance with one or more embodiments.

FIG. 1 shows an illustrative diagram for a user requesting to access a resource from a user device, in accordance with one or more embodiments. For example, FIG. 1 shows a user 102, a user device 104, and a resource 106. In some examples, the user device 104 may store an application. For instance, the application may be a mobile application and may provide a user interface. The user 102 may access the user interface through the user device 104. In some embodiments, the user 102 may make a user request to access resource 106 through the user interface. For example, the mobile application may facilitate access to one or more resources via a user account associated with the user. For instance, the user account may be associated with an entity (e.g., multimedia service provider, a company, a transportation authority, an organization, bank, or other entity) that may provide access to one or more resources. In some embodiments, the mobile application may also be associated with the entity. The entity may provide a mobile application for download to enable the user to access one or more account-related features associated with the user's account of the entity. For example, the user may log into his/her account associated with the entity via the mobile application to access one or more resources that the entity provides.

The user device 104 is shown as a smartphone. It should be noted that the user device may be any device that can connect to a wireless network (e.g., tablet, laptop, wearable devices, etc.). For example, the wireless network may be a Wi-Fi network, a cellular network, Bluetooth®, or other wireless network. In some examples, the user device may be associated with a mobile carrier through which it can connect to a cellular network. For example, the authentication platform may determine that the user device is associated with a mobile carrier prior to implementing the interactionless authentication platform described herein. In some examples, the user device may be connected to the internet through Wi-Fi.

To access one or more resources, the system may authenticate the user request. Conventionally, this may involve prompting the user for information (e.g., passwords, pin codes, biometric data, OTPs, dynamic codes, etc.) via one or more notifications (or other messages) transmitted over a wireless network when a user attempts to access the resource. The request-response patterns of these methods may cause an increase in network traffic, as the network must transmit a notification to the user device requesting information from the user and transmit the data. Furthermore, the potential for mistakes in the input information may further cause unnecessary traffic on the network. The system overcomes these issues by leveraging known information about the user device and forgoing the need for the user to enter data that could potentially contain errors when authenticating the user request. For example, the system may extract a user device identifier based on backend interactions with the user device and compare it to a known user device identifier, thereby forgoing the need to request or receive additional security credentials from the user. As such, the system may reduce network traffic on the computer network.

Figure 2:
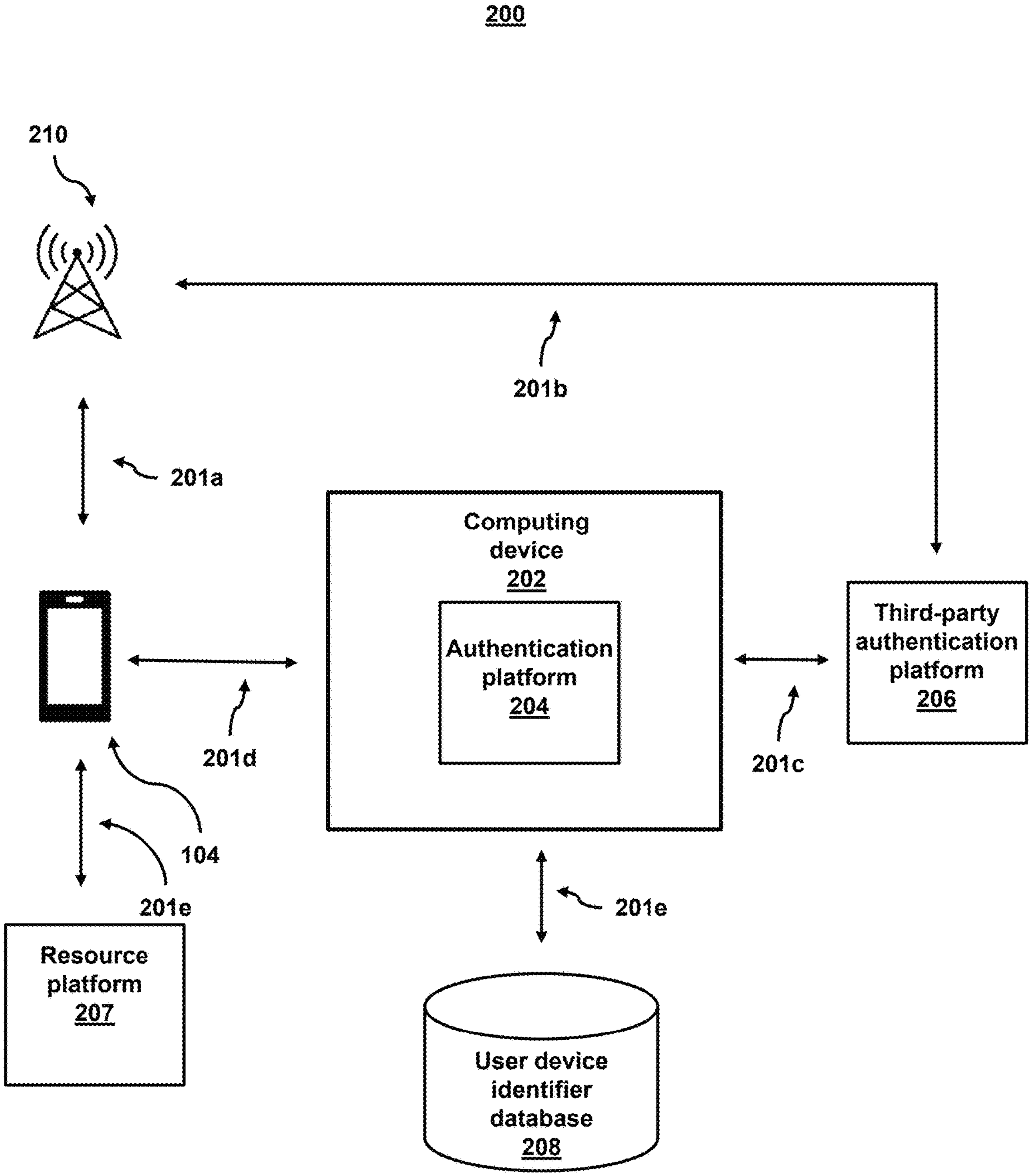
FIG. 2 shows an illustrative diagram for performing interactionless authentication process, in accordance with one or more embodiments.

FIG. 2 shows an illustrative diagram for a system used to perform the interactionless authentication process, in accordance with one or more embodiments. For example, FIG. 2 shows mobile carrier network 210, user device 104, computing device 202, authentication platform 204, third-party authentication platform 206, user device identifier database 208, and communication links 201 (or communication links 201*a*-201*e*). In some examples, the authentication platform 204 may be part of computing device 202. In other embodiments, however, authentication platform 204 may be part of other component(s) of FIG. 2.

Each component of system 200 may communicate with one another via communication links 201*a*-201*e*. For example, communication links 201*a*-201*e* may include wired or wireless communication paths, such as a satellite path, a fiber-optic path, a cable path, a path that supports Internet or intranet communication, free-space connections (e.g., for broadcast or other wireless signals), or any other suitable wired or wireless communication path or combination of communication paths. Additionally, each of the components of system 200 may include hardware or software that enables communication among communication links 201*a*-201*e*.

The system 200 leverages interactions between the components of the system to determine a user device identifier. As will be described in FIGS. 3A-3C, the authentication platform 204 may receive user device identifiers from the user device 104 and third-party authentication platform 206. The system may determine the user identifiers without requiring user input related to authenticating the user request. This eliminates subsequent user authentication requests due to user input mistakes and reduces network traffic associated with sending notifications requesting information and transferring responses. Also, by doing so, the system may reduce user friction associated with inputting requested information, thereby enhancing the user experience.

In some embodiments, the third-party authentication platform 206 may not have access to the user device identifier database 208 to enhance cybersecurity. For example, conventional methods of authentication may require systems to share databases containing user information with the third-party platform involved in verification. For example, biometric authentication (e.g., face identification, fingerprint identification, etc.) requires biometric data to be verified/authenticated by a third-party. To verify or authenticate a use of a plurality of users, the third-party must have access to a database with user information. This poses a privacy concern, since user information could potentially be leaked from the third-party platform. As shown in FIG. 2, in some embodiments the third-party authentication platform 206 may not have access to the user device identifier database.

The system may use an authentication platform to authenticate user requests. In disclosed embodiments, an authentication platform (e.g., authentication platform 204) may be hosted on a computing device, such as a server (e.g., computing device 202). In some embodiments, the authentication platform 204 may be in communication with a user device identifier database (e.g., user device identifier database 208). The user identifier database may store known user device identifiers, user information, authentication requests, authentication actions, cached information, or other information. Additionally or alternatively, the computing device may comprise the user device identifier database. In some embodiments, the computing device may be in communication with a user device (e.g., user device 104), from which a user may make a user request. In some embodiments, the computing device may be in communication with a third-party authentication platform (e.g., third-party authentication platform 206). For example, the authentication platform may be a program (or other authentication service) implemented on a computing device that enables authentication of user requests. The authentication platform may receive user requests from one or more user devices (e.g., user device 104) to be authenticated. For example, the user request may be a request to access one or more resources provided by an entity and/or a user account associated with a user of the user device. The authentication platform may receive the user request and may perform one or more authentication actions based on the user request, user device identifiers, mobile carrier-specific URLs, user information (e.g., user account information), or other information to authenticate the received user request to facilitate access to one or more resources.

In some embodiments, the system may receive user requests. For example, the system may receive user requests from a user device. The user device may be any computing device with the capability to connect to a computing network (e.g., a wireless network, a cellular network, a Wi-Fi network, Bluetooth®, etc.). In some embodiments, the user device may include a user interface that enables a user to facilitate the user request. In an example, the user interface is a part of a mobile application on the user device. For example, a user may interact with the user interface. In an example, the user may request to access a resource through the user interface. A resource may be any resource that is accessible by a computing system or a user, such as multimedia content (e.g., video games, images, videos, text, etc.), a product, service, item, website, user account setting(s), user account data, transaction(s), or other resources. In some examples, a resource may be accessed through a user account. For example, the user account may be associated with an entity (e.g., multimedia service provider, a company, a transportation authority, an organization, bank, or other entity) that may provide access to one or more resources. In an example, the user may log in to the user account with credentials (e.g., login credentials) via the mobile application to access one or more resources. In some embodiments, the user request may be a request to view and/or edit information in a resource. Additionally or alternatively, the user request may include facilitating a transaction that has been identified as high risk (e.g., wire transfer, opening a credit account, etc.). For example, the system may compare the category of a user request to a list of request category types that have been identified as high risk. The system may facilitate authentication of the user request based on determining that the category of the user request belongs to the list.

In some examples, the user device may have an embedded client instance of the authentication platform stored. The embedded client instance may be a software application (e.g., microservice) that is stored on the device. In an example, the embedded client instance may be part of the mobile application. The embedded client instance may have one or more permissions or access privileges to information associated with the user device (e.g., user information, device settings, device network settings, device network information, and/or the like). The system may use the embedded client instance of the authentication platform to retrieve information about the user device. For example, the system may determine an IP address associated with the user device through the embedded client instance of the authentication platform.

In some embodiments, the resource may be hosted on a resource platform (e.g., resource platform 207). The resource platform may be a server that facilitates access to one or more resources. For example, the resource platform may be part of the computing device. In another example, the resource platform may be separate from the computing device. In an embodiment, the user device may transmit a user request to the resource platform in response to receiving the user request. The resource platform may transmit a message to the authentication platform to authenticate the request in response to receiving the user request from the user device. Additionally or alternatively, the system may transmit a second message to the resource platform in response to authenticating or deauthenticating the user request. The resource platform may authenticate or deauthenticate the user request based on the second message.

In some embodiments, a mobile carrier (e.g., Verizon, AT&T, T-Mobile, etc.) may provide the user device with wireless communication services. The mobile carrier may be associated with a mobile carrier network (e.g., mobile carrier network 210) that provides wireless network service (e.g., cellular communications) for the user device. In some embodiments, the mobile carrier may include a mobile carrier interface. In an example, the user device and/or the third-party authentication platform may be able to communicate with the mobile carrier interface. A first address (e.g., Internet Protocol (IP) address, device serial number, International Mobile Equipment Identity (IMEI) number, etc.) may be determined for the user device. In some examples, the user device may be connected to the internet through Wi-Fi. In response to determining that a user device is connected to Wi-Fi, the authentication platform may retrieve a carrier-specific URL of the mobile carrier associated with the user device.

The system may use a third-party authentication platform (e.g., third-party authentication platform 206) to retrieve information associated with the user device based on an input. In disclosed embodiments, the third-party authentication platform may receive the first address associated with the user device from the authentication platform. Additionally or alternatively, the first address may be received from the computing device and/or the mobile carrier. The third-party authentication platform may return a second address based on the first address. In some examples, the second address may include a carrier-specific Uniform Resource Locator (URL). In some embodiments, the third-party authentication platform may receive a verification token from the authentication platform. Additionally or alternatively, the verification token may be received from the computing device and/or the mobile carrier. For example, the third-party authentication platform may determine a user device identifier (e.g. phone number, Subscribed Identity Model (SIM), etc.) based on an authentication request comprising the verification token and/or the first address. In an example, the third-party authentication platform may transmit the determined user device identifier to the authentication platform as part of an authentication response.

In some embodiments, the verification token may be time-sensitive. For example, the third-party authentication platform may compare the current time of the verification token with a predetermined time of validity. The current time may be the time that has elapsed since the creation of the verification token. For example, the third-party authentication may abandon operations in response to determining that the current time of the verification token is longer than the predetermined time of validity. Additionally, or alternatively, the verification token may be protected by encryption to create a secured verification token.

The system may compare an extracted user device identifier to a known user device identifier in a user device identifier database. For example, the authentication platform may extract the user device identifier from the authentication response received from the third-party authentication platform. In some embodiments, the authentication platform may access the user device identifier database with the known user device identifiers based on receiving the extracted user device identifier from the third-party authentication platform. In some examples, the user device identifier database may store one or more known user device identifiers listed for a user. The authentication platform may compare the extracted user device identifier to the known user device identifiers for the user in the database.

In some embodiments, the system may perform an authentication action based on comparing the extracted user device identifier received from the authentication response transmitted by the third-party authentication platform to the known user device identifier for a user. In an example, the system may authenticate the user request based on determining that the extracted user device identifier matches one or more known user identifiers. In some examples, subsequent to authenticating the user request, the system may complete the user request (e.g., enable access to a resource, retrieve a resource, etc.). In an example, completing the user request may include performing a transaction requested as part of the user request. In another example, completing the user request may include allowing the user to view and/or modify a resource. In another example, authenticating the user request may include deauthenticating the user request based on determining that the extracted user device identifier does not match the one or more known user identifiers. For example, deauthenticating the user request may include revoking an authentication of the user request. In another example, deauthenticating the user request may include denying the user request. In an example, deauthenticating the user request may include triggering authentication of the user request via a different authentication process (e.g., authenticating the user request based on different information).

In some embodiments, the system may cache the first address based on comparing the extracted user device identifier received from the third-party authentication platform to the known user device identifier for the user. For example, the cache may store the first address for a predetermined length of time. Additionally, or alternatively, the system may store the first address in a database. In an example, a time stamp may be stored with the first address. The system may cache the first address in response to determining that the extracted user device identifier matches the known user device identifier for the user. For example, the system may authenticate a subsequent user request from the user based on determining that a subsequent address associated with the subsequent user request matches a first address associated with a previous user request stored in the cache and/or database. In an example, the system may perform this authentication if the time stamp is within a predetermined length of time. Additionally or alternatively, the system may cache the first address in response to determining that the extracted user device identifier does not match the known user device identifier. The system may deauthenticate the subsequent user request from the user based on determining that the subsequent address associated with the subsequent user request matches a first address associated with a previous user request stored in the cache/database (e.g., caching addresses or other identifiers that are known to mismatch to efficiently deauthenticate user requests). In an example where the system deauthenticates and authenticates user requests based on the group of first addresses stored in the cache and/or database, an indication of whether the user request was authenticated or deauthenticated may be stored with each first address and/or user request. System decision to authenticate or deauthenticate the subsequent user request may be further based on the indications. In an example, the previous user request must be associated with the same user as the subsequent user request.

Figure 3A:
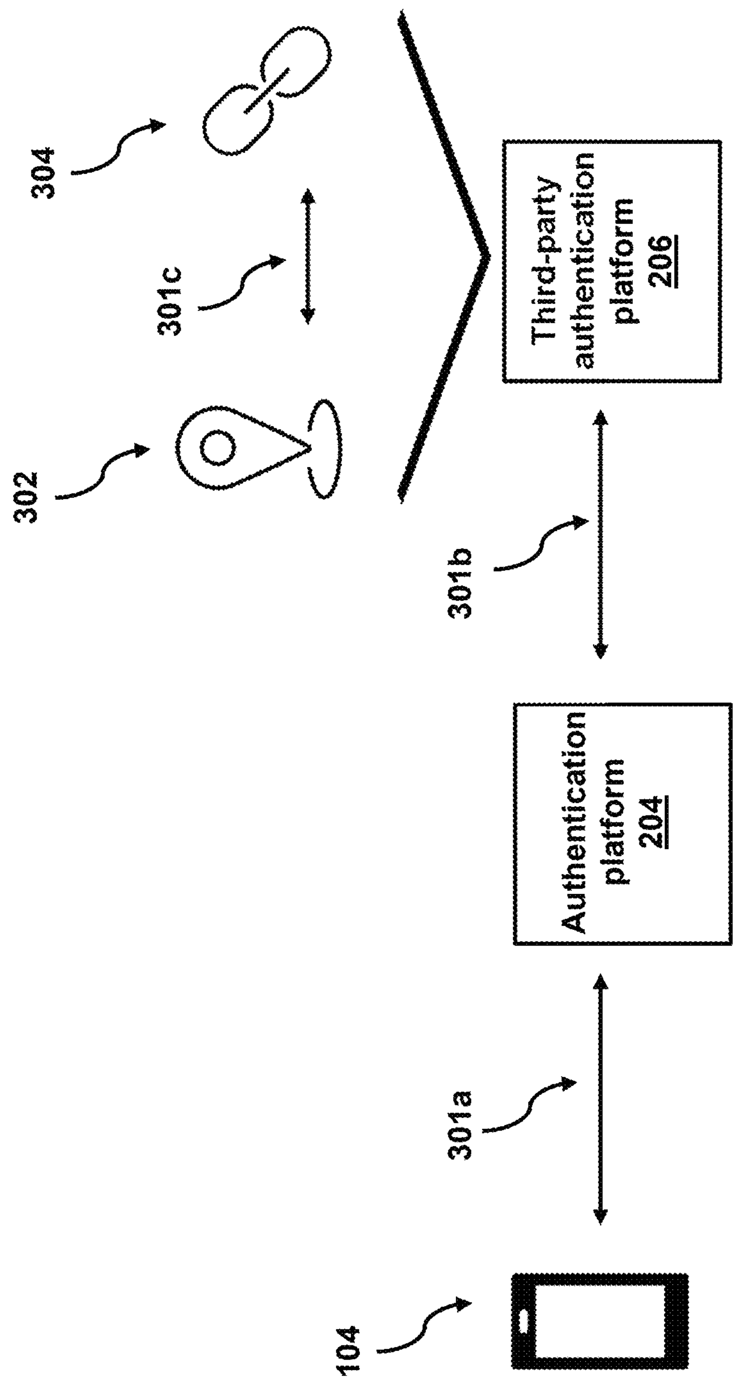
FIGS. 3A-3C show illustrative diagrams of determining a user device identifier of a user device for use in authenticating user requests, in accordance with one or more embodiments.
Figure 3B:
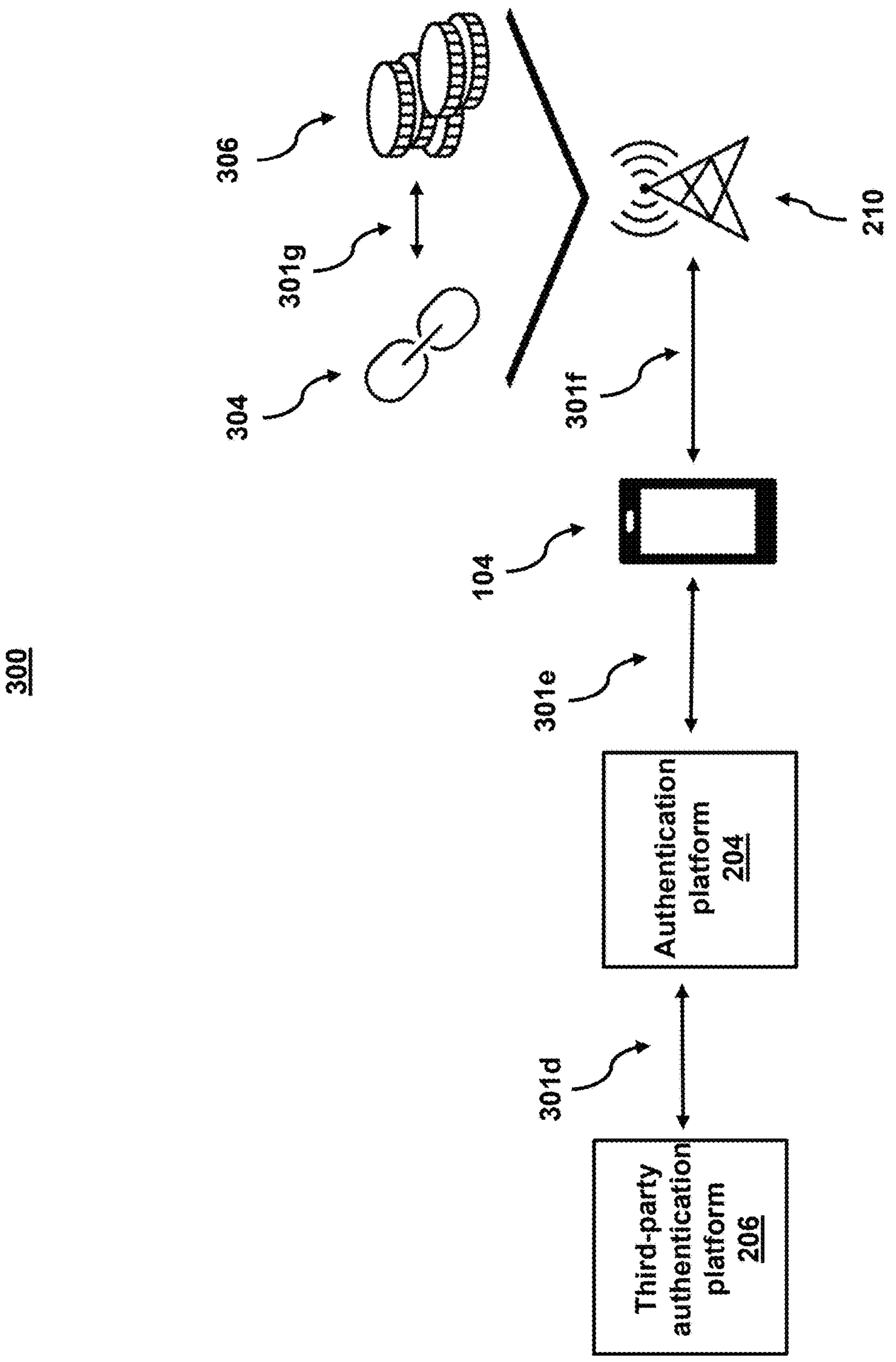
Figure 3C:
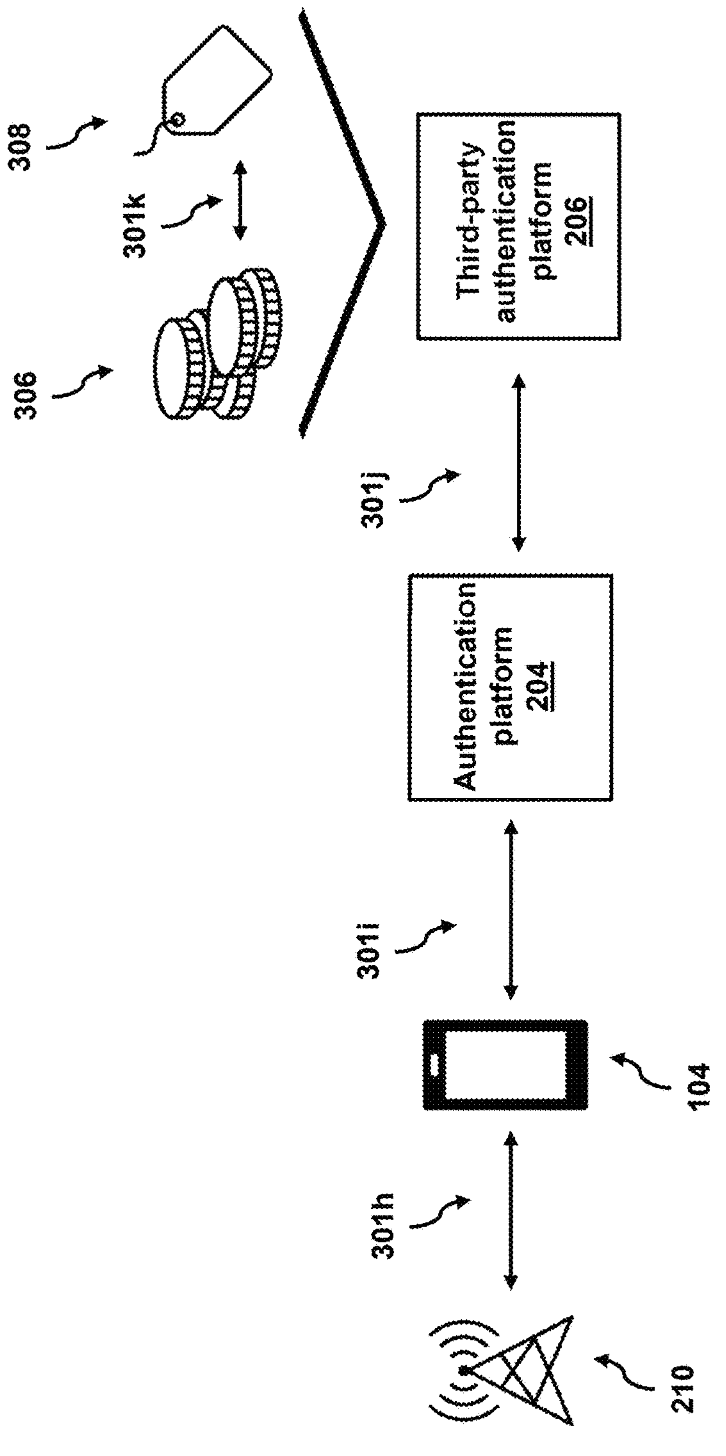

FIGS. 3A-3C show an illustrative diagram for determining a user device identifier of a user device for use in authenticating user requests, in accordance with one or more embodiments. Each component of system 300 may communicate with one another via communication links 301*a*-301*k*. For example, communication links 301*a*-301*k* may include wired or wireless communication paths, such as a satellite path, a fiber-optic path, a cable path, a path that supports Internet or intranet communication, free-space connections (e.g., for broadcast or other wireless signals), or any other suitable wired or wireless communication path or combination of communication paths. Additionally, each of the components of system 300 may include hardware/software that enable communication among communication links 301*a*-301*k*.

FIG. 3A illustrates determining a second address based on a first address. To reduce network traffic associated with authenticating user requests, the system may determine one or more addresses (e.g., device-related information) associated with a user device for use in authenticating a user request. For example, the system may leverage the determined address information to authenticate a user request without interaction by the user (e.g., by providing additional authentication information, such as one time passwords, pin codes, or biometrics). Rather, the system may use device-related information to authenticate the user request. However, to maintain secure authentication of user requests despite the system not relying on additional interaction from the user, the system may leverage one or more authentication platforms using such device-related information to verify the authenticity of the user requests to facilitate access to one or more resources.

For example, in connection with user device 104 transmitting a request to access a resource, authentication platform 204 may determine a first address associated with user device 104. The first address may be an IP address of the user device. For example, a user may transmit a request (e.g., to resource platform 207 (FIG. 2)) to access a resource. In some embodiments, in response to resource platform 207 receiving the request to access the resource, resource platform 207 may transmit a message to authentication platform 204 to authenticate the request. Based on receiving the message to authenticate the request, authentication platform 204 may determine the first address associated with user device 104. For example, authentication platform 204 may request the first address from user device 104, and user device 104 may transmit the first address to authentication platform 204. As another example, where user device 104 has an embedded client instance of authentication platform 204 stored, the embedded client instance may determine the first address from user device 104 via one or more permissions or access privileges to user device 104 information. For instance, the embedded client instance of authentication platform 204 may have access to user device 104 information (e.g., user information, device settings, device network settings, device network information) or other information. The embedded client instance of authentication platform 204 may retrieve the first address from the user device 104.

The first address (e.g., IP address) may be transmitted from the user device to the authentication platform 204. The authentication platform 204 may then transmit the first address to the third-party authentication platform 206 to determine a second address 304 based on receiving the first address 302. For example, the third-party authentication platform 206 may perform data mining to determine a mobile carrier associated with the user device. Third-party authentication platform 206 may then generate and transmit a carrier-specific URL in response to determining the mobile carrier to which the user device is associated with. For example, the third-party authentication platform 206 may data mine for a mobile carrier that is associated with the first address (e.g., the IP address) of the user device. For example, IP addresses may be dynamically assigned (e.g., via Dynamic Host Configuration Protocol (DHCP) or Network Address Translation (NAT)) to the user device based on the mobile carrier's network infrastructure. The third-party authentication platform 206 may data mine for matches between the user device's IP address and an IP address associated with a mobile carrier. Upon determining a mobile carrier that is associated with the first address of the user device (e.g., based on a match), the third-party authentication platform 206 may determine a carrier-specific URL of the determined mobile carrier. For example, the carrier-specific URL may be a carrier-specific verification URL that accepts verification requests to verify whether a user device is associated with the mobile carrier. The third-party authentication platform 206 may then transmit the determined carrier-specific URL to the authentication platform 204 for further processing.

FIG. 3B illustrates receiving a verification token based on the second address. The authentication platform 204 may transmit a verification token request based on the second address 304 to the authentication platform. For example, the authentication platform 204 may transmit a verification token request to the carrier-specific URL. In some embodiments, the verification token request may include the first address associated with the user device, a user identifier (e.g., user name, or other identifier that uniquely identifies the user), or other information. As discussed above, the carrier-specific URL may be the location of an interface (e.g., an API) that verifies whether a user device is associated with the mobile carrier. The carrier-specific URL may be associated with the mobile carrier network 210 that provides cellular service to the user device 104. For example, the mobile carrier-specific URL may receive verification token requests and may generate or otherwise issue verification tokens (e.g., verification token 306) that (i) indicates that the user device is associated with the given mobile carrier providing cellular service to the user device and (ii) may be time-sensitive. By doing so, the system may enhance authentication security by preventing man-in-the-middle attacks by leveraging the time-sensitivity of the verification tokens. Additionally, the system further enhances cybersecurity by verifying with a determined mobile carrier whether the user device transmitting a user request is actually associated with the mobile carrier. By doing so, the system may reduce network traffic by initially verifying whether a user device is associated with a particular mobile carrier as opposed to transmitting verification token requests to all available mobile carriers.

As such, in response to authentication platform 204 transmitting the verification token request to the second address 304, the interface associated with the second address 304 (e.g., the mobile carrier network 210's verification interface available via the carrier-specific URL) may generate a verification token 306. The verification token 306 may be transmitted to the authentication platform 204 for further processing, as described below.

FIG. 3C illustrates determining a user device identifier based on an authentication request. In some embodiments, the authentication platform 204 may transmit an authentication request to the third-party authentication platform 206. For example, the authentication request may be generated by authentication platform 204 and may include the received verification token 306. For instance, as the verification token 306 indicates that the user device of the user is associated with the user, the system may leverage the verification token to obtain the user device identifier 308. Third-party authentication platform 206 may process the authentication request to retrieve a user device identifier of the user device. For example, the third-party authentication platform 206 may first verify whether the verification token 306 is still valid (e.g., has not expired, is not outside of the predetermined time threshold, etc.) to enhance security. Upon third-party authentication platform 206 verifying that the verification token is valid, third-party authentication platform 206 may determine the user device identifier 308. For example, the user device identifier may be a phone number associated with the user device 104. The third-party authentication platform 206 may store user device identifiers associated with first addresses (e.g., IP addresses) in a database. Third-party authentication platform 206 may query the database for one or more matches to the first address of the user device 104 and a stored user device identifier of the database. Upon determining a match, the third-party authentication platform 206 may determine a user device identifier (e.g., phone number) associated with the matched IP address. Additionally or alternatively, the third-party authentication platform may perform data mining, web scraping, or other methods for determining the user device identifier. Upon determining the user device identifier 308, a third-party authentication platform may generate an authentication response. For example, the authentication response may include the user device identifier 308 associated with the user device of the user. In some embodiments, however, where the verification token is invalid or the third-party authentication platform 206 fails to determine a user device identifier 308 associated with the user device 104, the third-party authentication platform 206 may generate an authentication response, including an error message. For example, the error message may indicate a failure to identify a user device identifier or other error involved with authenticating/verifying the user device/user request. The third-party authentication platform 206 may transmit the authentication response to the authentication platform 204 for further processing.

In some embodiments, the extracted user device identifier 308 may be compared to a known user device identifier. For example, the authentication platform 204 may access a user device identifier database including a set of known user device identifiers. For example, the database, including the set of known user device identifiers, may be proprietary information associated with the entity providing the one or more resources to which the user is requesting. The authentication platform 204 may compare the extracted user device identifier 308 to the known user device identifiers. In some examples, the authentication platform 204 may perform an authentication action based on the comparison. For example, the authentication platform 204 may authenticate the user request based on determining that the extracted user device identifier matches a known user device identifier in the user device identifier database. In other examples, the authentication platform 204 may authenticate a user request based on determining that the extracted user device identifier does not match a known user device identifier in the user device identifier database.

Figure 4:
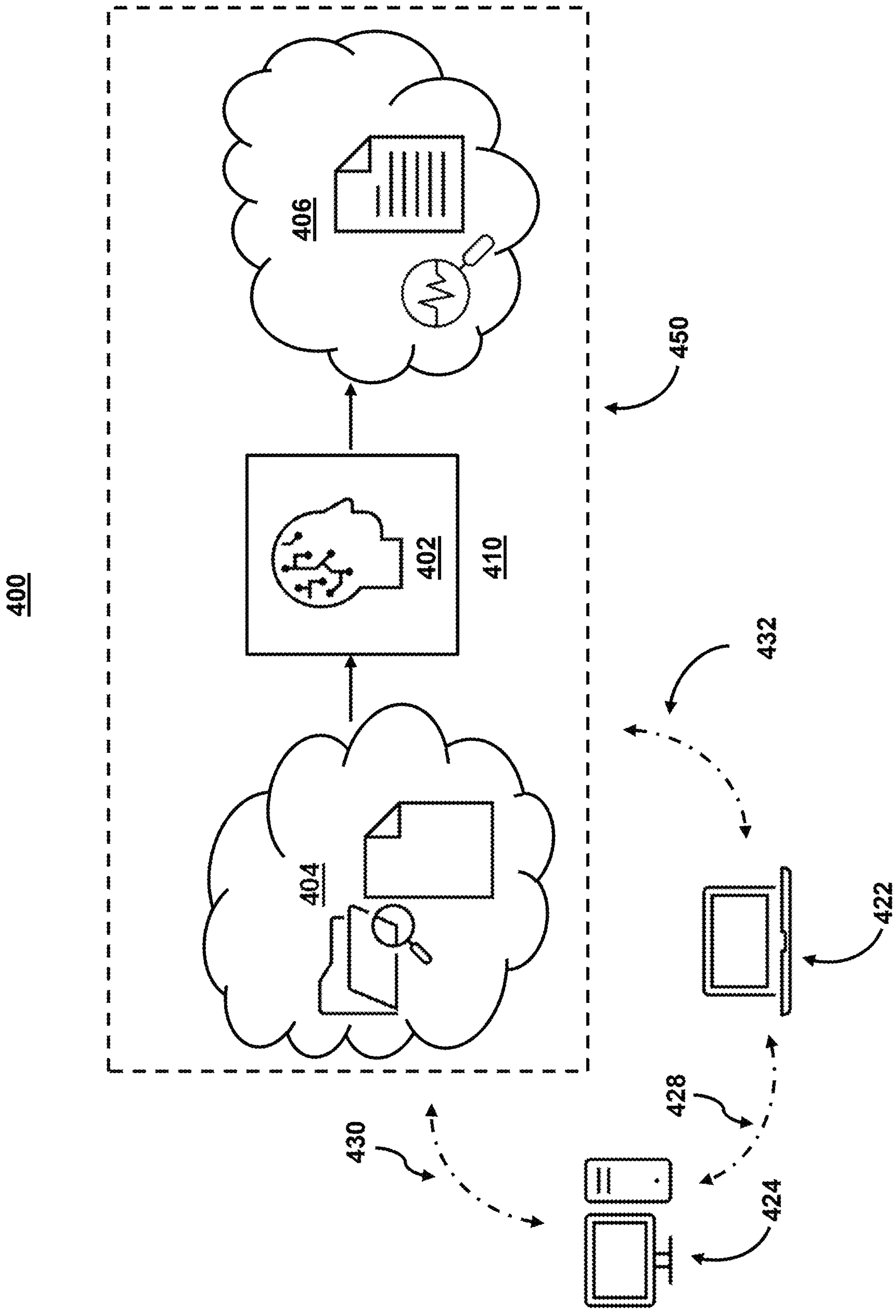
FIG. 4 shows illustrative components for a system used to reduce network traffic associated with authenticating user requests via interactionless authentication, in accordance with one or more embodiments.

FIG. 4 shows illustrative components for a system used to reduce network traffic, in accordance with one or more embodiments. For example, FIG. 4 may show illustrative components for interactionless authentication of a user. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, and other computer equipment (e.g., a server), including "smart," wireless, wearable, and/or mobile devices. FIG. 4 also includes cloud components 410. Cloud components 410 may alternatively be any computing device as described above, and may include any type of mobile terminal, fixed terminal, or other device. For example, cloud components 410 may be implemented as a cloud computing system, and may feature one or more component devices. It should also be noted that system 400 is not limited to three devices. Users may, for instance, utilize one or more devices to interact with one another, one or more servers, or other components of system 400. It should be noted, that, while one or more operations are described herein as being performed by particular components of system 400, these operations may, in some embodiments, be performed by other components of system 400. As an example, while one or more operations are described herein as being performed by components of mobile device 422, these operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., conversational response, queries, and/or notifications).

Additionally, as mobile device 422 and user terminal 424 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 400 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately, or together, include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may include one or more components of system 200 (FIG. 2) or diagram 100 (FIG. 1). For instance, cloud components 410 may include the computing device 202, authentication platform 204, third-party authentication platform 206, user device identifier database 208, resource platform 207, or other components (FIG. 2, FIGS. 3A-3C).

Cloud components 410 may access one or more databases. For example, the cloud components may access the user identifier database 208 with known user device identifiers or the database with a set of first addresses associated with previous user requests. In some embodiments, the authentication platform 204 may store information received from the mobile carrier network 210, user device 104, resource 106, and/or third-party authentication platform 206 in an additional database. For example, the authentication platform 204 may store verification tokens received from the user device in a verification token database. Cloud components 410 may access the additional database.

Cloud components 410 may include model 402, which may be a machine learning model, artificial intelligence model, etc. (which may be referred collectively as "models" herein). Model 402 may take inputs 404 and provide outputs 406. The inputs may include multiple datasets, such as a training dataset and a test dataset. Each of the plurality of datasets (e.g., inputs 404) may include data subsets related to user data, predicted forecasts and/or errors, and/or actual forecasts and/or errors. In some embodiments, outputs 406 may be fed back to model 402 as input to train model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether to authenticate a user request, whether to deauthenticate a user request, an extracted user device identifier associated with the user device, a first and/or second address, or other classification).

In a variety of embodiments, model 402 may update its configurations (e.g., weights, biases, or other parameters) based on the assessment of its prediction (e.g., outputs 406) and reference feedback information (e.g., user indication of accuracy, reference labels, or other information). In a variety of embodiments, where model 402 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., whether to authenticate a user request, whether to deauthenticate a user request, an extracted user device identifier associated with the user device, a first and/or second address, or other classification).

In some embodiments, the model (e.g., model 402) may automatically perform actions based on outputs 406. In some embodiments, the model (e.g., model 402) may not perform any actions. The output of the model (e.g., model 402) may be used to authenticate a user request, deauthenticate a user request, compare an extracted user device identifier with a known user device identifier, transmit a first and/or second address, or other actions.

System 400 also includes API layer 450. API layer 450 may allow the system to generate summaries across different devices. In some embodiments, API layer 450 may be implemented on mobile device 422 or user terminal 424. Alternatively, or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal, but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying WAF and DDoS protection, and API layer 450 may use RESTful APIs as standard for external integration.

Figure 5:
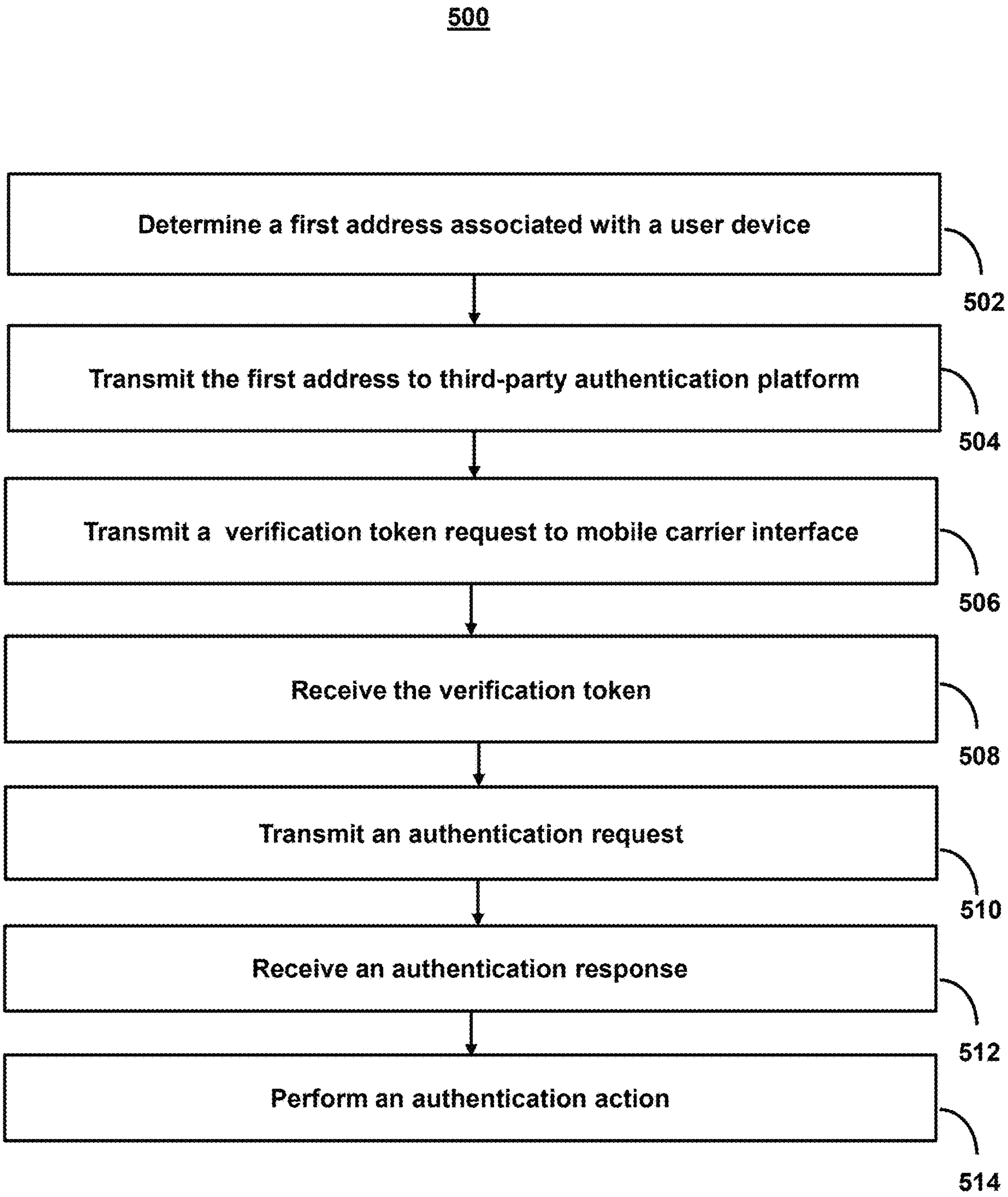
FIG. 5 shows a flowchart of the steps involved in reducing network traffic associated with authenticating user requests via interactionless authentication, in accordance with one or more embodiments.

FIG. 5 shows a flowchart of the steps involved in reducing network traffic associated with authenticating user requests via interactionless authentication, in accordance with one or more embodiments. For example, the system may use process 500 (e.g., as implemented on one or more system components described above) in order to reduce network traffic.

At step 502, process 500 (e.g., using one or more components described above) may determine a first address associated with a user device. For example, in connection with a user device transmitting a user request to access a resource, the system may determine a first address associated with the user device. In some examples, a user may make a user request to access a resource through a user device. To authenticate the user request, the system may leverage device-specific information to aid in authenticating the user request. In some embodiments, the user device may have a mobile application associated with an entity that provides access to the resource being requested. The user may log into an account associated with the entity via the mobile application, and may provide a request for a resource via a user interface provided by the mobile application. For example, the user request may include conducting a transaction that has been identified as high risk (e.g. wire transfer, opening a credit account, etc.).

While logging into the user's account may provide an initial layer of security, the system may leverage device-specific information to authenticate the user's request without further interaction from the user. Although on its surface, authenticating user requests via device-specific information may appear counterintuitive as the user need not provide additional security credentials (e.g., one time passwords, pin codes, pass phrases, etc.), the system enhances cybersecurity of the user's account information while improving the user experience. For example, as malicious entities may gain access to the user's account (e.g., by stealing passwords), leveraging device-specific information may provide an additional layer of security as the user request may be authenticated based on known device-specific information. In other words, even if malicious entities have access to the user's account, the system improves security of the user's account as the user requests additionally rely on whether the user request is being provided from, or performed on, a known user device of the user.

In some embodiments, the system may detect a user request to access a resource based on receiving the user request from the user device. For example, the system may detect that a user application (e.g., a mobile application) transmitted the user request to access the first resource based on receiving the user request from the user device. For instance, the system may detect that the user application transmitted the user request based on security information embedded within the user request. For example, the security information may include a mobile application identifier, a digital signature, a hash, or other value for use in determining that the mobile application installed on the user device transmitted the user request to access the resource. By doing so, the system may enhance cybersecurity of authenticating user requests. In some embodiments, in response to detecting that the user application transmitted the user request, the system may determine the first address associated with the user device.

In an example, the system may determine a first address (e.g. Internet Protocol (IP) address, device serial number, International Mobile Equipment Identity (IMEI) number, etc.) associated with the user device based on detecting the user request. In some embodiments, the system may determine the first address associated with the user device based on generating an address request for the first address. For example, the authentication platform may generate an address request for the first address associated with the user device and may transmit the address request to the user device. The address request may be a request to retrieve the first address associated with the user device. For example, the address request may be transmitted to the user device, and an embedded client instance of the authentication platform may retrieve or otherwise determine the first address associated with the user device. The embedded client instance of the authentication platform may then transmit a message to the authentication platform including the first address associated with the user device.

At step 504, process 500 (e.g., using one or more components described above) may transmit the first address to a third-party authentication platform. For example, the system may transmit the first address to the third-party authentication platform based on determining the first address associated with the user request. For instance, the third-party authentication platform may determine a second address based on the first address. The second address may be a Uniform Resource Locator (URL). For example, the URL may be specific to the mobile carrier associated with the user device. In some examples, the third-party authentication platform may transmit the second address to the authentication platform.

In some embodiments, the system may determine that the user request corresponds to a first category of user requests. For example, prior to transmitting the first address to the third-party authentication platform, the system may determine that the user request belongs to a first category of user requests. For instance, the authentication platform may determine that the user request belongs to the first category of user requests based on a value associated with the user request. For example, the value may indicate a transaction amount. The system may determine that the user request belongs to the first category of user requests based on determining that the value (e.g. the transaction amount) is above a threshold value. In this example, the threshold value may be determined based on querying a database. In another example, the value may indicate a type of user request (e.g. initiating a transfer, scheduling a bill payment, requesting account balance information, etc.). The first category of user request may include transactions that have been identified as high risk (e.g. wire transfer, opening a credit account, etc.). Each type of user request may be associated with a value. The system may determine that the user request belongs to the first category of user requests based on determining a match between the value associated with the user request and the values associated with user request types in the first category of user requests. In an example, the system may query a database storing values mapped to types of user requests to determine values associated with user request types in the first category of user requests. In an embodiment, the authentication platform may initiate the authentication process described herein based on determining that the user request belongs to the first category of user requests. For example, the authentication platform may transmit the first address to the third-party authentication platform based on determining that the user request belongs to the first category of user requests.

At step 506, process 500 (e.g., using one or more components described above) may transmit a verification token request to a mobile carrier interface. For example, in response to receiving a response indicating the URL (e.g., the carrier-specific URL), the system may transmit a verification token request to an interface associated with the mobile carrier based on the URL. The authentication platform may transmit the verification token request to the URL indicating an API to receive a verification token. For example, the authentication platform may generate the verification token request and transmit the verification token request to the mobile-carrier-specific URL. The interface associated with the mobile carrier may generate a verification token and transmit the verification token back to the authentication platform to be used in authenticating the user request. For example, the verification token may be a time sensitive token that indicates that the first address associated with the user device is associated with the mobile carrier. In this way, the system may provide a first layer of cybersecurity by verifying that the IP address of the user device is associated with that of the mobile carrier providing cellular network services to the user device.

At step 508, process 500 (e.g., using one or more components described above) may receive a verification token. For example, the system may receive a verification token from the interface, where the verification token verifies that the user device is associated with the mobile carrier. For example, the interface associated with the mobile carrier may transmit a verification token based on receiving a verification token request. The verification token may be transmitted by the mobile carrier interface to the authentication platform for use in authenticating the user request.

In some embodiments, the verification token may be associated with a first time period. For example, the first time period may be the time at which the verification token was created. The first time period may be compared to a second time period. In an example, the second time period may be the current time. The current time may refer to the time at which the first time is being compared to the second time (e.g., the current time). In response to the comparison failing to satisfy a validity condition, the system may perform an authentication action associated with the user request. For example, the authentication action may be to deauthenticate (e.g., deny) the user request. For example, the validity condition may refer to a verification token validity condition. For instance, where the validity condition indicates a predetermined time range (e.g., 1 second, 2 seconds, 5 seconds, 10 second, 60 second, 2 minutes, etc.), the system may determine whether the comparison of the first time period to the second time period satisfies the validity condition. For example, the system may determine whether the verification token is valid based on the first time period, the second time period, and the validity condition. By doing so, the system may ensure that the verification token is valid prior to transmitting the verification token to a third-party authentication platform, thereby decreasing the amount of wasted network traffic. In some embodiments, the system may compare the first time period to the second time period subsequent to transmitting the verification token to the third-party authentication platform. In this way, the system may enhance cyber security by ensuring that the verification token is still valid prior to authenticating the user request.

At step 510, process 500 (e.g., using one or more components described above) may transmit an authentication request. In some embodiments, the system may transmit the authentication request to the third-party verification platform based on receiving the verification token. The authentication request may include the verification token. For example, the authentication platform may generate an authentication request including the received verification token. As described above, the third-party authentication platform may generate an authentication response including a user device identifier associated with the user device of the user. For example, the user device identifier may be a phone number associated with the user device and the mobile carrier. By doing so, the system may enhance the user experience as the user need not submit additional security credentials to facilitate the user request. In this way, the system may reduce the amount of unnecessary network traffic as the user forgoes entering error-prone user credential information to obtain access to one or more resources, which traditionally may involve re-prompting the user for correct user credentials.

At step 512, process 500 (e.g., using one or more components described above) may receive an authentication response. For example, the system may receive, from the third-party authentication platform, an authentication response. The authentication response may include a user device identifier associated with the user device of the user. The third-party authentication platform may generate an authentication response based on receiving the authentication request from the authentication platform. For instance, the third-party authentication platform may perform data mining (or other method as described above) to determine a user device identifier associated with the user device of the user. The third-party authentication platform may then transmit the determined user device identifier to the authentication platform.

At step 514, process 500 (e.g., using one or more components described above) may perform an authentication action. For example, the system may perform an authentication action associated with the user request in response to receiving the authentication response. The authentication action may include authenticating (e.g., approving, permitting, allowing, etc.) the user request, deauthenticating (e.g., denying, revoking, disabling, etc.) the user request. For example, where the authentication action is to authenticate the user request, the system may authenticate the user request and enable the user access to the one or more resources requested. Additionally, or alternatively, where the authentication action is to deauthenticate the user request, the system may deny the user request to restrict the user from accessing the one or more resources requested.

In some embodiments, the authentication platform may perform the authentication action based on comparing the user device identifier to a known user device identifier. For example, the system may extract, from the authentication response, the user device identifier associated with the user device of the user. For instance, the system may parse the authentication response to extract the user device identifier of the user. The user device identifier may be a phone number (or other communications address) associated with the user device of the user. The authentication platform may access a database storing known user information. In an example, known user information may include a set of known user device identifiers (e.g., phone numbers, communications addresses, etc.) associated with user account identifiers. The system may compare the extracted user device identifier to the set of known user device identifiers to identify a match. In response to identifying a match, the system may authenticate the user request. However, in response to failing to identify a match, the system may deauthenticate the user request. By doing so, the system may authenticate validity of user requests based on known (e.g., ground truth) information as compared to retrieved information from the third-party authentication platforms, thereby forgoing the need for users to enter error-prone credentials-thereby reducing the amount of unnecessary network traffic while enhancing the user experience.

In some embodiments, the authentication platform may determine a user identifier associated with the user. For example, to reduce the amount of time querying the database storing the known user information, the system may determine a user identifier associated with the user based on the user request to access the resource. For example, the system may parse the user request to identify a user identifier associated with a user (e.g., username, name, login name, screen name, etc.). The system may then access the database storing the known user information using the user identifier associated with the user to retrieve the known user device identifier associated with the user. For example, the system may retrieve the known user device identifier associated with the user to be compared against the user device identifier extracted from the authentication response. In this way, the system may reduce the amount of computational resources associated with querying the database for a match between (i) the extracted user device identifier from the authentication response and (ii) a known user device identifier from the database. Similar to that as described above, the system may then compare the extracted user device identifier to the known user device identifier. For example, the authentication platform may perform the authentication action based on identifying a match between the known user device identifier and the extracted user device identifier. For instance, the authentication action may authenticate the user request based on determining a match between the extracted user device identifier and known user device identifier. In some examples, authenticating the user request may include completing the user request. For example, completing the user request may include performing a transaction requested as part of the user request. In another example, completing the user request may include allowing the user to view and/or modify a resource. In some examples, authenticating the user request may include performing an additional method of authentication.

In some embodiments, the system may cache information including the user device identifier, user identifier, first address, and/or second address associated with the user device based on performing an authentication action. For example, the authentication platform may cache information in response to authenticating the user request. For instance, in response to the authentication platform authenticating the user request, the authentication platform may cache (i) a user identifier associated with the user, (ii) the first address associated with the user device, or (iii) the user device identifier associated with the user device of the user. By doing so, the system may reduce authentication delays by storing user information related to authenticated actions. For instance, in some embodiments, in connection with the user device transmitting a second user request to access a second resource, the system may determine a third address (e.g., an IP address) associated with the user device transmitting the second user request. The system (e.g., the authentication platform) may access the cache to identify a match between the third address associated with the user device and a cached address associated with the user device. In some embodiments, the system may also determine whether a user identifier associated with the second user request matches a cached user identifier for additional verification. In response to identifying a match between the third address associated with the user device and a cached address associated with the user device (and/or the user identifier and a cached user identifier), the system may authenticate the second user request. Additionally, or alternatively, in response to failing to identify a match between the third address associated with the user device and a cached address associated with the user device (and/or the user identifier and a cached user identifier), the system may deauthenticate the second user request. By doing so, the system reduces authentication delays by accessing the cache to determine whether the user device is associated with a prior authenticated user request.

In some embodiments, the authentication action may deauthenticate the user request based on determining that the extracted user device identifier and known user device identifier do not match. For example, the system may extract, from the authentication response, the user device identifier associated with the user device of the user. The system may compare the extracted user device identifier to a set of known user device identifiers. In response to the comparison failing to indicate a match between (i) the extracted user device identifier and (ii) a known user device identifier from the set of known user device identifiers, the system may deauthenticate the user request. For example, deauthenticating the user request may include denying the user request, preventing access to the resource, revoking the user request, disabling the user request from being completed, or otherwise preventing authentication of the user request.

In some embodiments, the authentication action may deauthenticate the user request based on a user identifier associated with the user. For example, the system (e.g., the authentication platform) may determine a user identifier associated with the user. For instance, the system may extract a user identifier from the user request to access the resource. The system may access a database storing known user information based on the user identifier associated with the user, to retrieve a known user device identifier associated with the user. For example, the known user information may include a set of known user device identifiers (e.g., phone numbers) associated with known user account identifiers (e.g., name, login name, account name, screen name, etc.). The system may query the database using the extracted user identifier (e.g., name, login name, account name, screen name, etc.) to retrieve the known user device identifier (e.g., phone number) associated with the extracted user identifier. The system may then compare the extracted user device identifier to the known user device identifier. In response to the comparison failing to indicate a match between (i) the extracted user device identifier and (ii) the known user device identifier, the system may deauthenticate the user request. Additionally, or alternatively, in response to the comparison indicating a match between (i) the extracted user device identifier and (ii) the known user device identifier, the system may authenticate the user request. By doing so, the system may add a second layer of cyber security by verifying whether a known user device identifier matches that of the extracted user device identifier. In this way, the system may compare known proprietary user device information with that of third-party derived user device information to authenticate user requests.

In some embodiments, the authentication platform may cache information including the user device identifier, first address, and/or second address associated with the user device based on deauthenticating the user request. For example, the authentication platform may cache information in response to deauthenticating the user request. In some embodiments, the cache for authenticated user requests and deauthenticated user requests may be separate from each other. However, where the caches are not separate, the system may additionally store the authentication action (e.g., authenticated user requests and deauthenticated user requests) in the cache as well to differentiate between historically authenticated and deauthenticated user requests. For instance, the system may cache (i) a user identifier associated with the user device of the user, (ii) the first address associated with the user device, or (iii) the user device identifier associated with the user device of the user, in response to deauthenticating the user request. In some embodiments, the system may additionally cache the authentication action (e.g., deauthenticating the user request). By doing so, the system may reduce authentication delays by storing user information related to deauthenticated actions. For instance, in connection with the user device transmitting a second user request to access a second resource, the system may determine a third address (e.g., an IP address) associated with the user device.

Similar to that as described above, the system may access the cache to identify a match between the third address associated with the user device and a cached address associated with the user device. In response to identifying a match between the third address associated with the user device and a cached address associated with the user device, the system may deauthenticate the second user request. Additionally, or alternatively, in response to failing to identify a match between the third address associated with the user device and a cached address associated with the user device, the system may authenticate the second user request. By doing so, the system reduces authentication delays by accessing the cache to determine whether the user device is associated with a prior authenticated user request. Moreover, where the caches are not separate, the system may further access the cache to determine whether the determined address associated with the user device matches another address associated with the user device in the cache. Upon identifying a match between the determined address associated with the user device and a cached address, the system may determine whether the cached address is associated with an authenticated user request, or a deauthenticated user request. In response to determining that the cached address is associated with an authenticated user request, the system may authenticate the second user request. Alternatively, in response to determining that the cached address is associated with a deauthenticated user request, the system may deauthenticate the second user request.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one of the embodiments may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for reducing network traffic associated with authenticating user requests via interaction less authentication.
2. The method of the preceding embodiment, further comprising: in connection with a user device transmitting a user request to access a resource, determining, a first address associated with the user device, wherein the first address uniquely identifies the user device of a user; transmitting the first address to a third-party authentication platform that determines a Uniform Resource Locator (URL) that is specific to a mobile carrier of the mobile device of the user; in response to receiving a response indicating the URL, transmitting a verification token request to an interface associated with the mobile carrier based on the URL; receiving a verification token from the interface, wherein the verification token verifies that the user device is associated with mobile carrier; transmitting an authentication request to the third-party authentication platform, the authentication request comprising the received verification token; receiving, from the third-party authentication platform, an authentication response comprising a user device identifier associated with the user device of the user; and in response to receiving the authentication response, performing an authentication action associated with the user request.

3. The method of any one of the preceding embodiments, further comprising detecting that a user application transmitted the user request to access the resource based on receiving the user request from the user device; and in response to detecting that the user application transmitted the user request, determining the first address associated with the user device.

4. The method of any one of the preceding embodiments, wherein determining the first address associated with the user device further comprises: generating an address request for the first address associated with the user device; transmitting the address request to the user device; and receiving, from the user application, the first address associated with the user device.

5. The method of any one of the preceding embodiments, wherein the verification token is associated with a first time period, and wherein the method further comprises: comparing the first time period to a current time; and in response to the comparison failing to satisfy a validity condition, performing the authentication action associated with the user request, wherein the authentication action deauthenticates the user request.

6. The method of any one of the preceding embodiments, wherein the user device identifier is a phone number associated with (i) the mobile carrier and (ii) the user device.

7. The method of any one of the preceding embodiments, wherein performing the authentication action further comprises: extracting, from the authentication response, the user device identifier associated with the user device of the user; comparing the extracted user device identifier to a set of known user device identifiers; and in response to identifying a match between (i) the extracted user device identifier and (ii) a known user device identifier from the set of known user device identifiers, performing the authentication action associated with the user request, wherein the authentication action authenticates the user request.

8. The method of any one of the preceding embodiments, wherein performing the authentication action further comprises: determining, based on the user request to access the resource, a user identifier associated with the user; accessing a first database storing known user information, based on the user identifier associated with the user, to retrieve a known user device identifier associated with the user, wherein the known user information comprises a set of known user device identifiers associated with user account identifiers; extracting, from the authentication response, the user device identifier associated with the user device of the user; comparing the extracted user device identifier to the known user device identifier; and in response to the comparison indicating a match between (i) extracted user device identifier and (ii) the known user device identifier, performing the authentication action associated with the user request, wherein the authentication action authenticates the user request.

9. The method of any one of the preceding embodiments, wherein performing the authentication action further comprises: extracting, from the authentication response, the user device identifier associated with the user device of the user; comparing the extracted user device identifier to a set of known user device identifiers; and in response to the comparison failing to indicate a match between (i) the extracted user device identifier and (ii) a known user device identifier from the set of known user device identifiers, performing the authentication action associated with the user request, wherein the authentication action deauthenticates the user request.

10. The method of any one of the preceding embodiments, wherein performing the authentication action further comprises: determining, based on user request to access the resource, a user identifier associated with the user; accessing a first database storing known user information, based on the user identifier associated with the user, to retrieve a known user device identifier associated with the user, wherein the known user information comprises a set of known user device identifiers associated with user account identifiers; extracting, from the authentication response, the user device identifier associated with the user device of the user; comparing the extracted user device identifier to the known user device identifier; and in response to comparison failing to indicate a match between (i) the extracted user device identifier and (ii) the known user device identifier, performing the authentication action associated with the user request, wherein the authentication action deauthenticates the user request.

11. The method of any one of the preceding embodiments, further comprising: prior to transmitting the first address to the third-party authentication platform, determining, based on a value associated with the user request, that the user request corresponds to a first category of user requests; and in response to determining that the user request corresponds to the first category of user requests, transmitting the first address to the third-party authentication platform.

12. The method of any one of the preceding embodiments, further comprising: in response to the authentication action resulting in authentication of the user request, caching, in a cache, (i) the user device identifier associated with the user device of the user and (ii) the first address associated with the user device.

13. The method of any one of the preceding embodiments, further comprising: in connection with the user device transmitting a second user request to access a second resource, determining a second address associated with the user device; accessing the cache to identify a match between the second address associated with the user device and a third address associated with a second user device; and in response to identifying the match between the second address associated with the user device and the third address associated with the second user device, performing the authentication action associated with the user request, wherein the authentication action authenticates the user request.

14. The method of any one of the preceding embodiments, further comprising: in response to the authentication action resulting in deauthentication of the user request, caching, in a cache, (i) the user device identifier associated with the user device of the user and (ii) the first address associated with the user device.

15. The method of any one of the preceding embodiments, further comprising: in connection with the user device transmitting a second user request to access a second resource, determining a second address associated with the user device; accessing the cache to identify a match between the second address associated with the user device and a third address associated with a second user device; and in response to identifying the match between the second address associated with the user device and the third address associated with the second user device, performing the authentication action associated with the user request, wherein the authentication action deauthenticates the user request.

16. A method being implemented by one or more processors executing computer program instructions that, when executed perform the method outlined in embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for reducing network traffic associated with authenticating user requests via interactionless authentication, the system comprising:

a mobile application hosted on a mobile device of a user, wherein the mobile application (i) receives a user request associated with accessing a resource via a user interface presented on the mobile device of the user, (ii) is communicatively coupled to an authentication platform to authenticate the user in response to receiving the user request, and (iii) transmits the user request to the authentication platform; and the authentication platform hosted on a computing device, the computing device comprising:

one or more processors; and a non-transitory computer-readable medium comprising instructions that, when executed by the one or more processors, cause operations comprising:

in response to receiving the user request, generating an address request for an Internet Protocol (IP) address associated with the mobile device of the user;

subsequent to transmitting the address request to the mobile device of the user, receiving, via the mobile device, the IP address associated with the mobile device of the user;

transmitting the IP address to a third-party authentication platform that determines a carrier-specific Uniform-Resource-Locator (URL) indicating an address specific to a mobile carrier of the mobile device of the user;

in response to receiving a response indicating the carrier-specific URL from the third-party authentication platform, transmitting a verification token request to an Application Programming Interface (API) associated with the mobile carrier based on the carrier-specific URL;

receiving a time-sensitive verification token from the API, wherein the time-sensitive verification token verifies that the mobile device is associated with the mobile carrier;

transmitting an authentication request to the third-party authentication platform, the authentication request comprising the received time-sensitive verification token;

receiving, from the third-party authentication platform an authentication response, wherein the authentication response comprises a mobile device identifier associated with the mobile device of the user; and in response to the mobile device identifier of the authentication response matching a known mobile device identifier associated with the user, authenticating the user request associated with accessing the resource.

2. A method for reducing network traffic associated with authenticating user requests via interactionless authentication, the method comprising:

in connection with receiving a user request to access a resource transmitted via a user application of a user device of a user, generating an address request for a first address associated with the user device of the user;

subsequent to transmitting the address request to the user device of the user, receiving, via the user device, the first address associated with the user device, wherein the first address uniquely identifies the user device of the user;

transmitting the first address to a third-party authentication platform that determines a carrier-specific Uniform-Resource-Locator (URL) indicating an address specific to a mobile carrier of the user device of the user;

in response to receiving a response indicating the carrier-specific URL from the third-party authentication platform, transmitting a verification token request to an Application Programming Interface (API) associated with the mobile carrier based on the carrier-specific URL;

receiving a verification token from the API, wherein the verification token verifies that the user device is associated with the mobile carrier;

transmitting an authentication request to the third-party authentication platform, the authentication request comprising the received verification token;

receiving, from the third-party authentication platform, an authentication response comprising a user device identifier associated with the user device of the user; and in response to receiving the authentication response, performing an authentication action associated with the user request based on a matching between the user device identifier and a known user device identifier.

3. The method of claim 2, wherein the verification token is associated with a first time period, and wherein the method further comprises:

comparing the first time period to a current time; and in response to the comparison failing to satisfy a validity condition, performing the authentication action associated with the user request, wherein the authentication action deauthenticates the user request.

4. The method of claim 2, wherein the user device identifier is a phone number associated with (i) the mobile carrier and (ii) the user device.

5. The method of claim 2, wherein performing the authentication action further comprises:

extracting, from the authentication response, the user device identifier associated with the user device of the user;

comparing the extracted user device identifier to a set of known user device identifiers; and in response to identifying a match between (i) the extracted user device identifier and (ii) the known user device identifier from the set of known user device identifiers, performing the authentication action associated with the user request, wherein the authentication action authenticates the user request.

6. The method of claim 2, wherein performing the authentication action further comprises:

determining, based on the user request to access the resource, a user identifier associated with the user;

accessing a first database storing known user information, based on the user identifier associated with the user, to retrieve the known user device identifier associated with the user, wherein the known user information comprises a set of known user device identifiers associated with user account identifiers;

extracting, from the authentication response, the user device identifier associated with the user device of the user;

comparing the extracted user device identifier to the known user device identifier; and in response to the comparison indicating a match between (i) extracted user device identifier and (ii) the known user device identifier, performing the authentication action associated with the user request, wherein the authentication action authenticates the user request.

7. The method of claim 2, wherein performing the authentication action further comprises:

extracting, from the authentication response, the user device identifier associated with the user device of the user;

comparing the extracted user device identifier to a set of known user device identifiers; and in response to the comparison failing to indicate a match between (i) the extracted user device identifier and (ii) the known user device identifier from the set of known user device identifiers, performing the authentication action associated with the user request, wherein the authentication action deauthenticates the user request.

8. The method of claim 2, wherein performing the authentication action further comprises:

determining, based on user request to access the resource, a user identifier associated with the user;

accessing a first database storing known user information, based on the user identifier associated with the user, to retrieve the known user device identifier associated with the user, wherein the known user information comprises a set of known user device identifiers associated with user account identifiers;

extracting, from the authentication response, the user device identifier associated with the user device of the user;

comparing the extracted user device identifier to the known user device identifier; and in response to comparison failing to indicate a match between (i) the extracted user device identifier and (ii) the known user device identifier, performing the authentication action associated with the user request, wherein the authentication action deauthenticates the user request.

9. The method of claim 2, the method further comprising:

prior to transmitting the first address to the third-party authentication platform, determining, based on a value associated with the user request, that the user request corresponds to a first category of user requests; and in response to determining that the user request corresponds to the first category of user requests, transmitting the first address to the third-party authentication platform.

10. The method of claim 2, further comprising:

in response to the authentication action resulting in authentication of the user request, caching, in a cache, (i) the user device identifier associated with the user device of the user and (ii) the first address associated with the user device.

11. The method of claim 10, further comprising:

in connection with the user device transmitting a second user request to access a second resource, determining a second address associated with the user device;

accessing the cache to identify a match between the second address associated with the user device and a third address associated with a second user device; and in response to identifying the match between the second address associated with the user device and the third address associated with the second user device, performing the authentication action associated with the user request, wherein the authentication action authenticates the user request.

12. The method of claim 2, further comprising:

in response to the authentication action resulting in deauthentication of the user request, caching, in a cache, (i) the user device identifier associated with the user device of the user and (ii) the first address associated with the user device.

13. The method of claim 12, further comprising:

in connection with the user device transmitting a second user request to access a second resource, determining a second address associated with the user device;

accessing the cache to identify a match between the second address associated with the user device and a third address associated with a second user device; and in response to identifying the match between the second address associated with the user device and the third address associated with the second user device, performing the authentication action associated with the user request, wherein the authentication action deauthenticates the user request.

14. One or more non-transitory computer-readable media storing computer program instructions that, when executed by one or more processors, cause operations comprising:

in connection with receiving a user request to access a resource transmitted via a user application of a user device of a user, generating an address request for a first address associated with the user device of the user;

subsequent to transmitting the address request to the user device of the user, receiving, via the user device, the first address associated with the user device;

transmitting the first address to a third-party authentication platform that determines a carrier-specific Uniform-Resource-Locator (URL) indicating an address specific to a mobile carrier of the user device of the user;

in response to receiving a response indicating the carrier-specific URL from the third-party authentication platform, transmitting a verification token request to an Application Programming Interface (API) associated with the mobile carrier based on the carrier-specific URL;

receiving a verification token from the API, wherein the verification token verifies that the user device is associated with the mobile carrier;

transmitting an authentication request to the third-party authentication platform, the authentication request comprising the received verification token;

receiving, from the third-party authentication platform, an authentication response comprising a user device identifier associated with the user device of the user; and in response to receiving the authentication response, performing an authentication action associated with the user request based on the user device identifier and a known user device identifier.

15. The media of claim 14, wherein the instructions that, when executed by the one or more processors, further cause operations comprising:

extracting, from the authentication response, the user device identifier associated with the user device of the user;

comparing the extracted user device identifier to a set of known user device identifiers; and in response to identifying a match between (i) extracted user device identifier and (ii) the known user device identifier from the set of known user device identifiers, performing the authentication action associated with the user request, wherein the authentication action authenticates the user request.

16. The media of claim 14, wherein performing the authentication action further comprises:

extracting, from the authentication response, the user device identifier associated with the user device of the user;

comparing the extracted user device identifier to a set of known user device identifiers; and in response to the comparison failing to indicate a match between (i) extracted user device identifier and (ii) the known user device identifier from the set of known user device identifiers, performing the authentication action associated with the user request, wherein the authentication action deauthenticates the user request.

17. The media of claim 14, wherein the instructions that, when executed by the one or more processors, further cause operations comprising:

prior to transmitting the first address to the third-party authentication platform, determining, based on a value associated with the user request, that the user request corresponds to a first category of user requests; and in response to determining that the user request corresponds to the first category of user requests, transmitting the first address to the third-party authentication platform.

18. The media of claim 14, wherein the verification token is associated with a first time period, and wherein the instructions that, when executed by the one or more processors, further cause operations comprising:

comparing the first time period to a current time; and in response to the comparison failing to satisfy a validity condition, performing the authentication action associated with the user request, wherein the authentication action deauthenticates the user request.

19. The media of claim 14, wherein the user device identifier is a phone number associated with (i) the mobile carrier and (ii) the user device.

20. The media of claim 14, wherein the instructions that, when executed by the one or more processors, further cause operations comprising:

in response to the authentication action resulting in authentication of the user request, caching, in a cache, (i) the user device identifier associated with the user device of the user and (ii) the first address associated with the user device.

* * * * *